US005408293A

United States Patent [19]

[11] Patent Number: 5,408,293

[45] Date of Patent: Apr. 18, 1995

Sakamoto et al.

[54] CAMERA SYSTEM AND PHOTOMETRY CIRCUIT IN AN ELECTRONIC FLASH DEVICE

[75] Inventors: Hiroshi Sakamoto, Kawasaki; Hideki Matsui, Fujisawa, both of Japan

[73] Assignee: Nikon Corporation, Tokyo, Japan

[21] Appl. No.: 116,762

[22] Filed: Sep. 7, 1993

[30] Foreign Application Priority Data

Sep. 11, 1992 [JP] Japan .................................. 4-242488

[51] Int. Cl.$^6$ .............................................. G03B 15/05

[52] U.S. Cl. ..................................... 354/416; 354/432

[58] Field of Search ............... 354/416, 417, 458, 137, 354/145.1, 432

[56] References Cited

U.S. PATENT DOCUMENTS 4,297,011 10/1981 Adams, Jr. .......................... 354/416
4,398,127 8/1983 Bahn ............................ 354/145.1 X
4,603,954 8/1986 Egawa et al. ....................... 354/137

*Primary Examiner*—W. B. Perkey
*Attorney, Agent, or Firm*—Shapiro and Shapiro

[57] ABSTRACT

An electronic flash device is designed such that a photocurrent output from a light receiving circuit is converted into a frequency by a photocurrent-frequency converter circuit, the frequency output of the photocurrent-frequency converter circuit is counted by a counter, the output of the counter and the output of a comparator circuit are compared with each other by the comparator circuit and the result of the comparison is input to a light emission control circuit.

10 Claims, 6 Drawing Sheets

CAMERA SYSTEM AND PHOTOMETRY CIRCUIT IN AN ELECTRONIC FLASH DEVICE

BACKGROUND OF THE INVENTION

1. Field of the Invention

This system relates to a camera system and a photometry circuit in an electronic flash device.

2. Related Background Art

A photometry circuit such as auto flash control in an electronic flash device has heretofore been designed such that an integration capacitor is charged with the photocurrent of a light receiving element directly or through an amplifier and the voltage thereof is compared with a reference value corresponding to a proper quantity of light by an analog comparator and on the basis of the result of the comparison, light emission is stopped and auto flash control is effected with the proper quantity of light.

In the prior art, the extent to which analog circuits such as a photocurrent integrating circuit, a comparator and reference voltage occupy space has been great and the interface when control is effected by a digital circuit such as a microcomputer has been difficult. In the prior art, the gain of an amplifier and a reference voltage at the most have been produced by a D/A converter and the control of the most of auto flash control has only been effected by an analog circuit. Accordingly, as compared with an electronic flash device before a microcomputer is carried therein, the circuit scale of the analog system has not become small and rather, the circuit has become complicated as the whole electronic flash device correspondingly to the fact that a microcomputer is carried therein, and this has led to the bulkiness and increased costs of the device.

SUMMARY OF THE INVENTION

It is an object of the present invention to provide a camera system and an electronic flash device in which the general circuit scale regarding photometry processing is reduced.

To process the integrated value of photometry by a digital circuit such as a microcomputer, A/D conversion must first be effected. What poses a problem here is A/D conversion delay relative to a high-speed phenomenon such as the flashing of an electronic flash device. The flashing time sometimes is 50 $\mu$S or less when the quantity of light is small. Also, in the existing microcomputer-containing successive comparison type 8-bit A/D converters, the conversion time is of the order of 20 $\mu$S at highest. In this case, it will be seen that even if the integrated value reaches a proper quantity of light, over-exposure of at least 40% in terms of time exists in principle before the microcomputer judges the stoppage of light emission and thus, the flash control characteristic when the quantity of light is small is very bad. Also, if a flash A/D converter is used, the conversion time can be shortened, but in any case, the microcomputer must always compare the result of A/D conversion with a reference value and judge whether light emission should be stopped, and thus, during that period, other processes cannot be carried out at all. Accordingly, in principle, the prior-art A/D conversion system is not suitable and a novel system becomes necessary.

DESCRIPTION OF THE PREFERRED EMBODIMENTS

Figure 1:
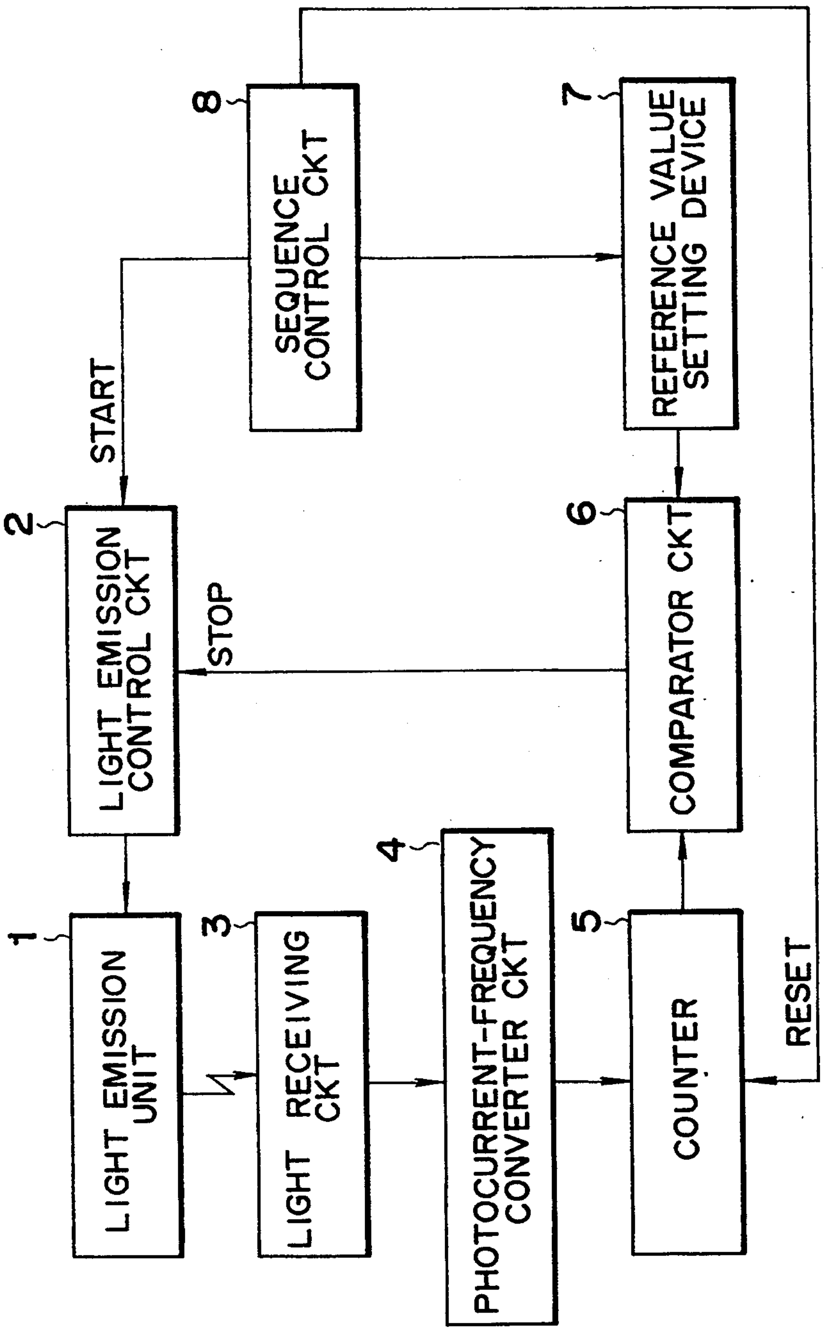
FIG. 1 is a diagram showing the outline of each embodiment of the present invention.

FIG. 1 shows the outline of each embodiment of the present invention. Each embodiment is provided a light emission control circuit 2, a light receiving circuit 3, a photocurrent-frequency converter circuit 4, a counter 5, a comparator circuit 6 and a reference value setting device 7, and is designed such that the photocurrent output from the light receiving circuit 3 is converted into a frequency by the photocurrent-frequency converter circuit 4, the frequency output thereof is counted by the counter 5, the output of the counter 5 is compared with the output of the comparator circuit 6 by the reference value setting device 7, and the result of the comparison is input to the light emission control circuit 2 to thereby stop light emission.

The construction of FIG. 1 will now be described in more detail. A light emission unit 1 is specifically an Xe discharge tube and the start and stoppage of its light emission is controlled by the light emission control circuit 2. The light emission control circuit 2 is comprised of a main capacitor, a booster circuit for charging it, a trigger circuit for starting flashing, a switching element for stopping the flashing, etc. When a light emission start signal (START) is output from a sequence control circuit 8 to the light emission circuit 2, flashing is started and the light receiving circuit 3, in the case of outside auto flash control, converts the object reflected light of the flashlight of the light emission unit 1 into a photocurrent, and in the case of manual flash control in which the quantity of light is preset by an electronic flash device, also converts the object reflected light into a photocurrent within the electronic flash device. The photocurrent-frequency converter circuit 4 is a circuit which generates a frequency in conformity with the photocurrent produced by the light receiving circuit 3, and the output frequency thereof is counted by the counter 5. That is, the count value of the counter 5 is equal to the integrated value of the quantity of light. The output of the counter 5 is compared with the output of the reference value setting device 7 by the comparator circuit 6, and when the output of the counter 5 coincides with or becomes greater than the latter output, a light emission stop signal (STOP) is output from the comparator circuit 6 to the light emission control circuit 2, whereby the flashing is terminated. Also, prior to the flashing, the sequence control circuit 8 resets (RESET signal) the counter 5, and an output corresponding to a proper quantity of light is input from the reference value setting device 7 to the comparator circuit 6.

The photocurrent-frequency converter circuit 4 will now be described in detail.

First Embodiment

Figure 2:
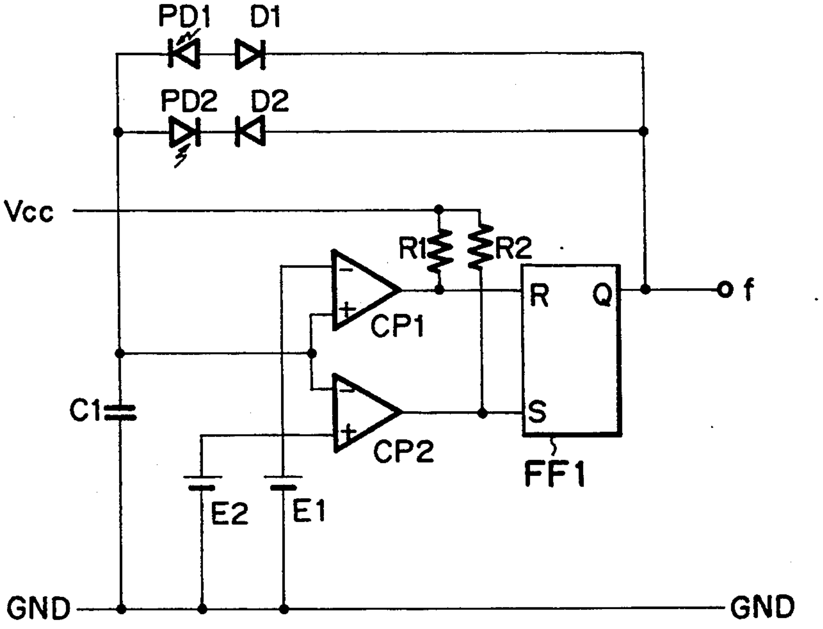
FIG. 2 is a diagram of the circuits around the photocurrent-frequency converter circuit of a first embodiment.

FIG. 2 is a circuit diagram of the light receiving circuit and photocurrent-frequency converter circuit of a first embodiment. First, photodiodes PD1 and PD2 receiving flashlight are connected to an integration capacitor C1 in opposite directions. Switching diodes D1 and D2 are series-connected to the photodiodes PD1 and PD2, respectively, and when the output Q of a flip-flop FF1 which will be described later is H, the photodiode PD1 charges the integration capacitor C1, and when the output Q of the flip-flop FF1 is L, the photodiode PD2 discharges the integration capacitor C1. The output Q of the flip-flop FF1 is either H or L and therefore, if the photodiodes PD1 and PD2 receive light, the integration capacitor C1 will be either charged or discharged without fail. Reference voltages E1 and E2 (E1 > E2) are then prepared, and a comparator CP1 compares the voltage of the integration capacitor C1 with the reference voltage E1, and a comparator CP2 compares the voltage of the integration capacitor C1 with the reference voltage E2. Resistors R1 and R2 are the output pull-up resistors of the open collectors of the comparators CP1 and CP2.

Figure 3:
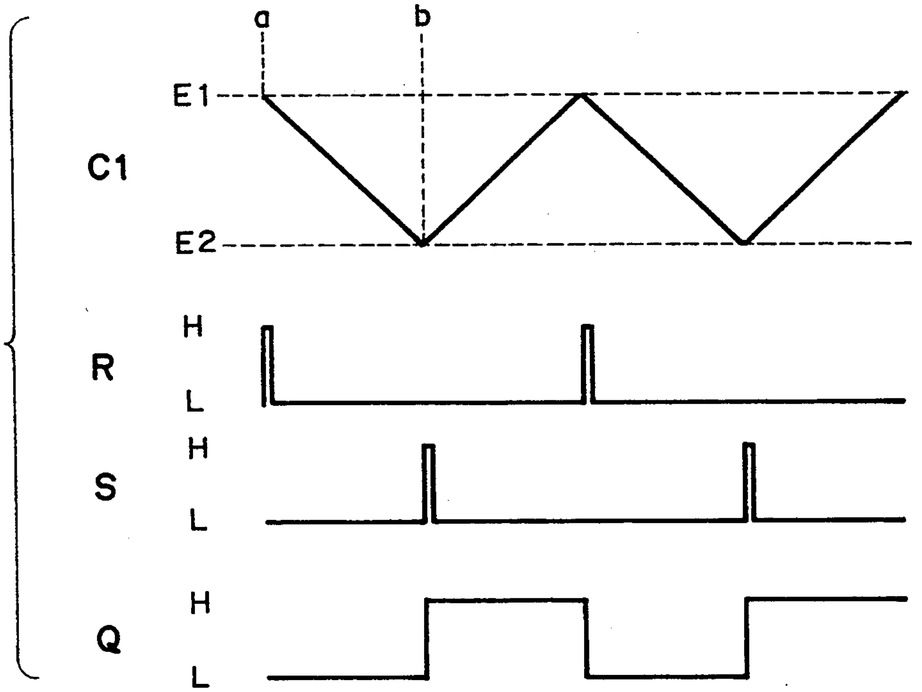
FIG. 3 is a timing chart of the first embodiment.

The operations of the circuits will now be described with reference to FIG. 3. When the voltage of the integration capacitor C1 exceeds the reference voltage E1, the open collector output of the comparator CP1 becomes H and acts on the reset input R of the flip-flop FF1 of an SR latch, and the output Q becomes L. At this point of time, the charging of the integration capacitor C1 is terminated and the discharging by the photodiode PD2 is started. When the discharging progresses by the photocurrent (at point (a) in FIG. 3), the voltage of the integration capacitor C1 reaches a level below the reference voltage E2, and at this point of time, the output of the comparator CP2 becomes H and acts on the set input S of the flip-flop FF1, and the output Q again becomes H (at point (b) in FIG. 3).

Accordingly, each time the photocurrent charges or discharges the integration capacitor C1 by the potential difference of an absolute value (E1–E2), the flip-flop FF1 repeats setting and resetting and the frequency becomes high in proportion to the photocurrent. In FIG. 2, the output Q of the flip-flop FF1 is taken out as a frequency output, but alternatively the OR of the set input S and the reset input R may be taken to thereby obtain a double frequency.

Putting a constant into the circuit as an example and calculating the output frequency by way of trial, when the integration capacitor C1 = 100 pF and the reference voltage E1 − E2 = 0.5 V and the photocurrent is 100 $\mu$A, 0.5 $\mu$S is required to charge 100 pF to 0.5 V with 100 $\mu$A and therefore, the frequency by charging and discharging becomes 1 MHz. This degree of frequency is within a range which can be sufficiently handled by a digital circuit, and comparators will do enough if they are of a high-speed type.

Second Embodiment

In the first embodiment, if a time lag exists from after the voltage of the integration capacitor reaches the reference voltage until charging and discharging change over, overshoot will first take place before charging and discharging change over, and after charging and discharging change over, the amount corresponding to the overshoot will be made up for by reverse charging and discharging and therefore, after all, the overshoot will appear as a double integration error. The time lag from after the voltage of the integration capacitor reaches the reference voltage until charging and discharging change over is almost determined by the response speed of the comparators, but this cannot be neglected if the photocurrent becomes great. So, in a second embodiment, it is considered to make the overshoot of the integration capacitor to the reference voltage small.

Figure 4:
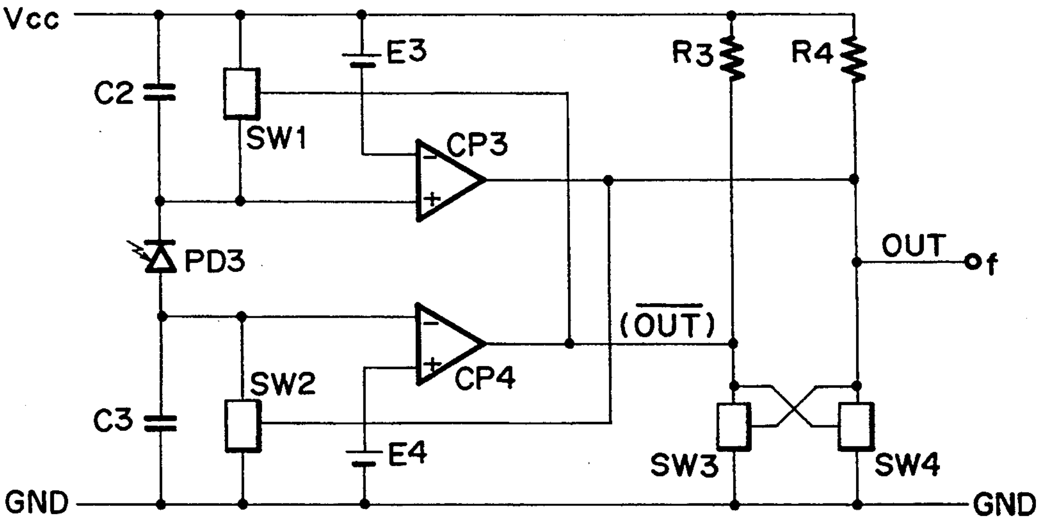
FIG. 4 is a diagram of the circuits around the photocurrent-frequency converter circuit of a second embodiment.
Figure 5:
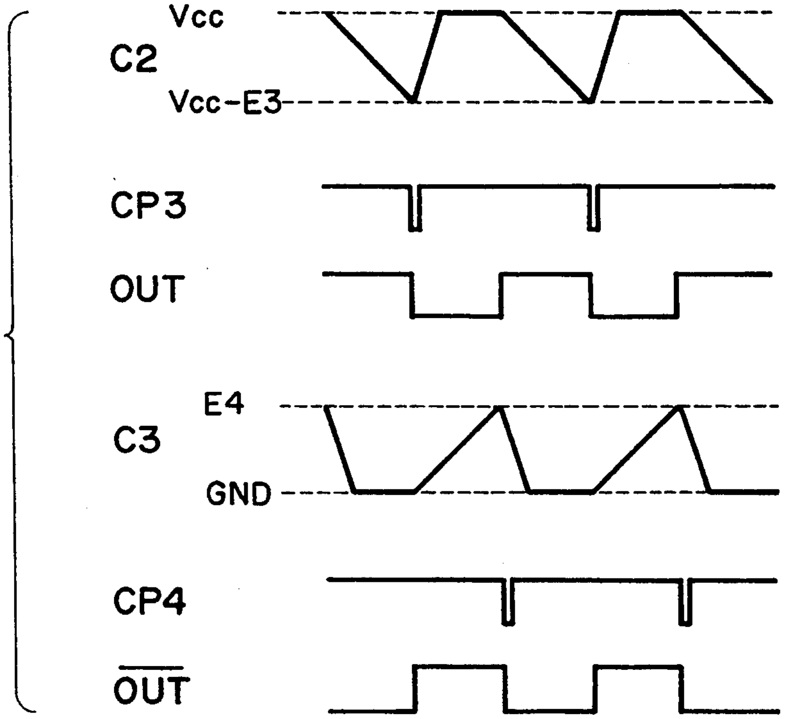
FIG. 5 is a timing chart of the second embodiment.

FIG. 4 is a circuit diagram of the second embodiment. In the second embodiment, a photodiode PD3 is used as a light receiving element, and two integration capacitors C2 and C3 are used. A description will hereinafter be given with reference to the circuit diagram. The integration capacitor C2 integrates the photocurrent of the photodiode PD3 by a voltage source Vcc reference, and the integration capacitor C3 integrates the photocurrent of the photodiode PD3 by GND reference. SW1–4 designate analog switches, and it is to be understood that the integration capacitor C2 can be discharged by the analog switch SW1 and the integration capacitor C3 can be discharged by the analog switch SW2. The analog switches SW1 and SW2 are always controlled by a circuit which will be described later so that one of them may be ON and the other may be OFF. Assuming a state in which the analog switch SW1 is OFF and the analog switch SW2 is ON, the integration capacitor C2 is charged with the photocurrent of the photodiode PD3 and the integration capacitor C3 is discharged and also, the photocurrent flows through the analog switch SW2. The timing chart of FIG. 5 starts from this state, but when integration progresses, the integration capacitor C2 is charged up to Vcc-E3 and the open collector OUT of a comparator CP3 becomes L, thus rendering the control terminal of the analog switch SW3 connected to a pull-up resistor R4 into L. Thereupon, the analog switch SW3 becomes OFF and therefore, a pull-up resistor R3 rises to H and at the same time, the control terminal of the analog switch SW4 becomes H and the analog switch SW4 becomes ON, whereby the OFF of the analog switch SW3 is latched. Accordingly, the analog switch SW1 connected to the pull-up resistor R3 becomes ON and conversely, the integration capacitor C2 is discharged and the analog switch SW2 becomes OFF, whereby the integration capacitor C3 begins to be charged. When thereafter, the integration capacitor C3 is charged up to a reference voltage E4, a latch circuit likewise comprised of the analog switches SW3 and SW4 is reversed and a frequency is generated at an output terminal OUT. The reason why the SR latch is comprised of the analog switches SW3 and SW4 is that it happens that many of versatile IC analog switches IC contain four circuits therein, and use may also be made of an SR latch using ordinary WAND.

The feature of this circuit is that at a point of time whereat the integrated value reaches the reference voltage, the integration capacitors change over and therefore the influence of overshoot by the response delay of the comparator is independent of the next integration period. Also, only one light receiving element is used and therefore, the photocurrent is stable, and when E3 = E4 and C2 = C3, if the AND of the outputs of comparators CP3 and CP4 is taken, a double frequency can be taken out with good accuracy.

Third Embodiment

A description will now be given of a photocurrent-frequency converter circuit further improved in the accuracy to a great photocurrent. The first and second embodiment are of a type in which the photocurrent directly creates a frequency, but there is another type. Conceptually, this type is one in which a photocurrent is collected in a capacitor and when the voltage thereof reaches a predetermined value or greater, discharging is effected by a predetermined current for a very short predetermined time and the frequency of the discharging is counted to thereby effect the integration of the quantity of light.

Figure 6:
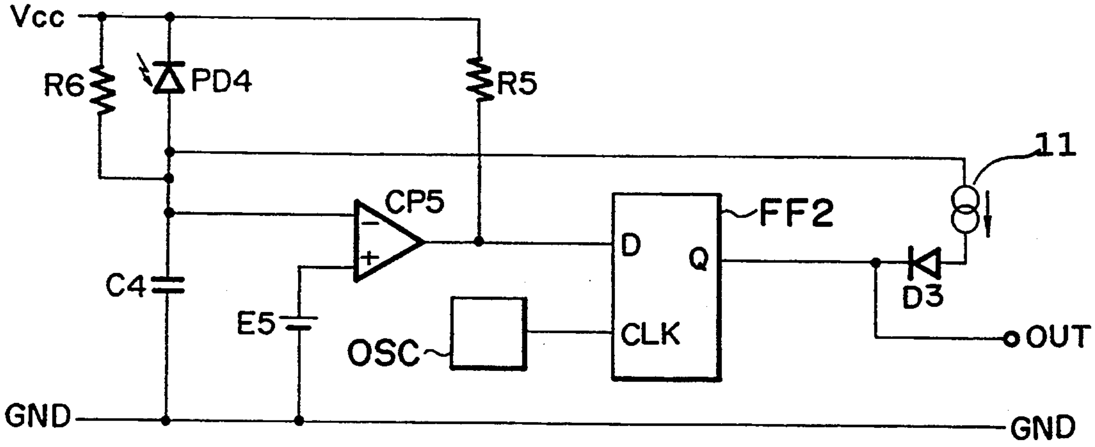
FIG. 6 is a diagram of the circuits around the photocurrent-frequency converter circuit of a third embodiment.
Figure 7:
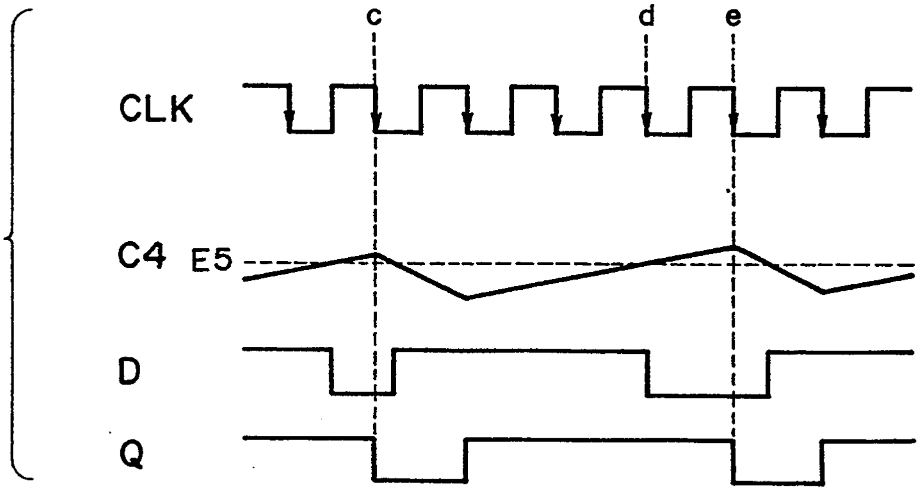
FIG. 7 is a timing chart of the third embodiment.

This will hereinafter be described with reference to FIG. 6. A photodiode PD4 always charges an integration capacitor C4 if it receives light. When the voltage of the integration capacitor C4 reaches a predetermined reference voltage E5 or greater, the open collector output of a comparator CP5 with a pull-up resistor R5 becomes L and the D input of a D latch FF2 connected thereto becomes L. An oscillator OSC is oscillating at a high frequency and the clock input CLK of the D latch FF2 output-latches the D input to an output Q at the negative edge. Accordingly, the output Q becomes L at the negative edge (the timing of point (c) in FIG. 7) of the first clock CLK after the voltage of the integration capacitor reaches a predetermined reference E5 or greater, and this state is continued for one cycle of the oscillator OSC. The output Q of the D latch FF2 switches on a constant current circuit 11 through a switching diode D3. Thereby, the integration capacitor C4 and the photocurrent flowing at that point of time can be discharged by a predetermined amount. Thereafter this process is repeated and even if, for example, at the timing of point (d) in FIG. 7, the open collector output of the comparator CP5 becomes L immediately after the negative edge of the clock CLK, discharging corresponding to one cycle, i.e., one count, is effected without fail at the timing of point (e) of the next negative edge.

The feature of this circuit is that the amount of discharge corresponding to one count is constant in principle and even if there is a slight response delay in the comparator, the amount of charge corresponding thereto is stored in the integration capacitor and is discharged sooner or later and therefore highly accurate integration of the quantity of light can be expected. Also, by making the frequency of the oscillator OSC sufficiently high, it is possible to enhance the resolving power.

In this circuit, it is desirable that before the start of the integration, the voltage of the integration capacitor C4 be closely approximate to the reference voltage E5. This is because counting is not started until the voltage of the integration capacitor C4 exceeds the reference voltage E5 and therefore, if for example, light reception is started after the integration capacitor C4 is completely discharged, the photocurrent for charging the integration capacitor up to the reference voltage E5 will not be counted at all. So, a resistor 6 may be parallel-connected to the photodiode PD4 and the integration capacitor C4 may normally be charged with a weak current. This becomes equivalent to the fact that a weak photocurrent flows and thus, the voltage of the integration capacitor C4 is in the vicinity of the reference voltage E5 before the start of photometry. Of course, the dark current of the photodiode PD4 or the bias current of the comparator CP5 may replace it if possible.

The constant current value which should be set in the constant current circuit 11 should be equal to or greater than the maximum photocurrent of the photodiode PD4. If the constant current value is below the maximum photocurrent, the voltage of the integration capacitor C4 will not fall even if discharging takes place near the peak of flashing at which the maximum photocurrent is created. In this state, the integration of the quantity of light by counting will be delayed relative to the photocurrent. Also, if the constant current value is too small, the discharging of the integration capacitor C4 will completely be not in time and the capacitor will become saturated, thus bringing about an absolute reduction in accuracy more than a time delay. If conversely, the constant current value is too great, the amount of discharge during one cycle of discharging will be great with a result that the output frequency will be reduced and the resolving power will become bad. Thus, the constant current value which should be set in the constant current circuit 11 may preferably be set so as to be slightly greater than the maximum photocurrent of the photodiode PD4.

As described above, there could be proposed several kinds of photocurrent-frequency converting methods. A description will now be made of an example in which auto flash control of an electronic flash device is effected by the use of the output of the photocurrent-frequency conversion.

Fourth Embodiment

Figure 8:
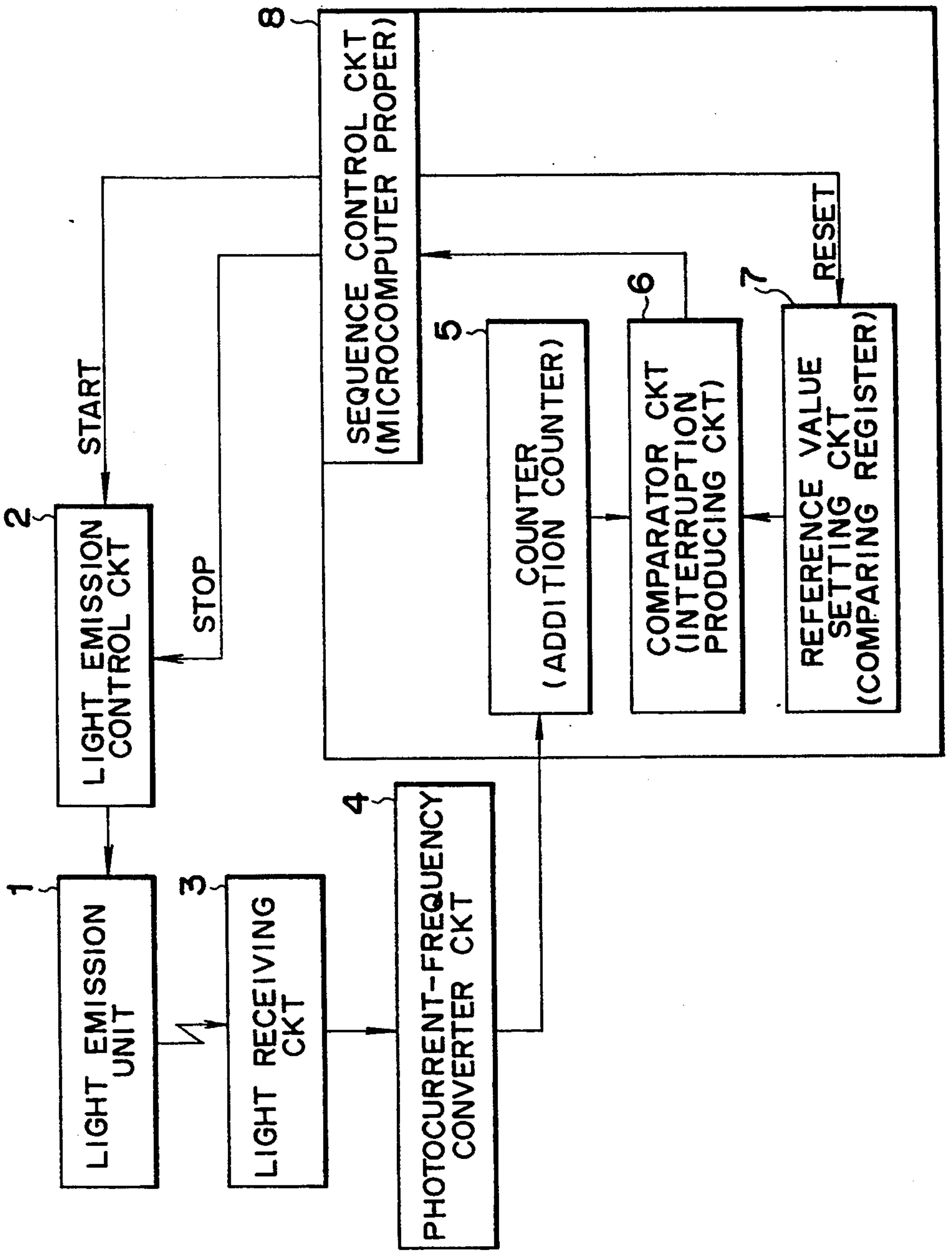
FIG. 8 is a block diagram of a fourth embodiment.

Referring back to FIG. 1, description will hereinafter be given of an embodiment in which the counter 5, the comparator circuit 6, the reference value setting device 7 and the sequence control circuit 8 which have not been described in the previous embodiments are embodied by a microcomputer. FIG. 8 is a diagram in which the construction of FIG. 1 is re-depicted with the microcomputer as the central element. The sequence control circuit 8 corresponds to the microcomputer proper, and the counter 5, the comparator 6 and the reference value setting device 7 are contained in the microcomputer. The counter 5 is, for example, an addition counter of the order of 16 bits. Also, the count source of the counter 5 is the external input from the aforedescribed photocurrent-frequency converter circuit 4. On the other hand, the reference value setting device 7 is a comparing register of the same bit length as the counter 5, and a numerical value corresponding to a proper quantity of light is input thereto before light emission. The comparator circuit 6 is an interruption producing circuit which compares the value of the counter 5 with the value of the reference value setting device 7 and produces an interruption demand when the two values become equal to each other. The sequence control circuit 8 clears the counter 5 before light emission, clears the interruption demand and also permits the interruption. When flashing is to be started in synchronism with the release or the like of the camera, a start signal is output to the light emission control circuit 2, whereby flashing is started. For example, in the case of external auto flash control, the object reflected light of the flashlight is received by the light receiving circuit 3, and as previously described, the addition of the counter 5 is progressed by the frequency output from the photocurrent-frequency converter circuit 4. As soon as the value of the counter 5 becomes equal to the value of the reference value setting device 7, interruption is produced and at the head of the interruption processing routine, a stop signal is output to the light emission control circuit 2, whereby flashing is stopped. The substance of the interruption processing routine is that much, and it is to be understood that it immediately returns to the main routine.

Fifth Embodiment

Figure 9:
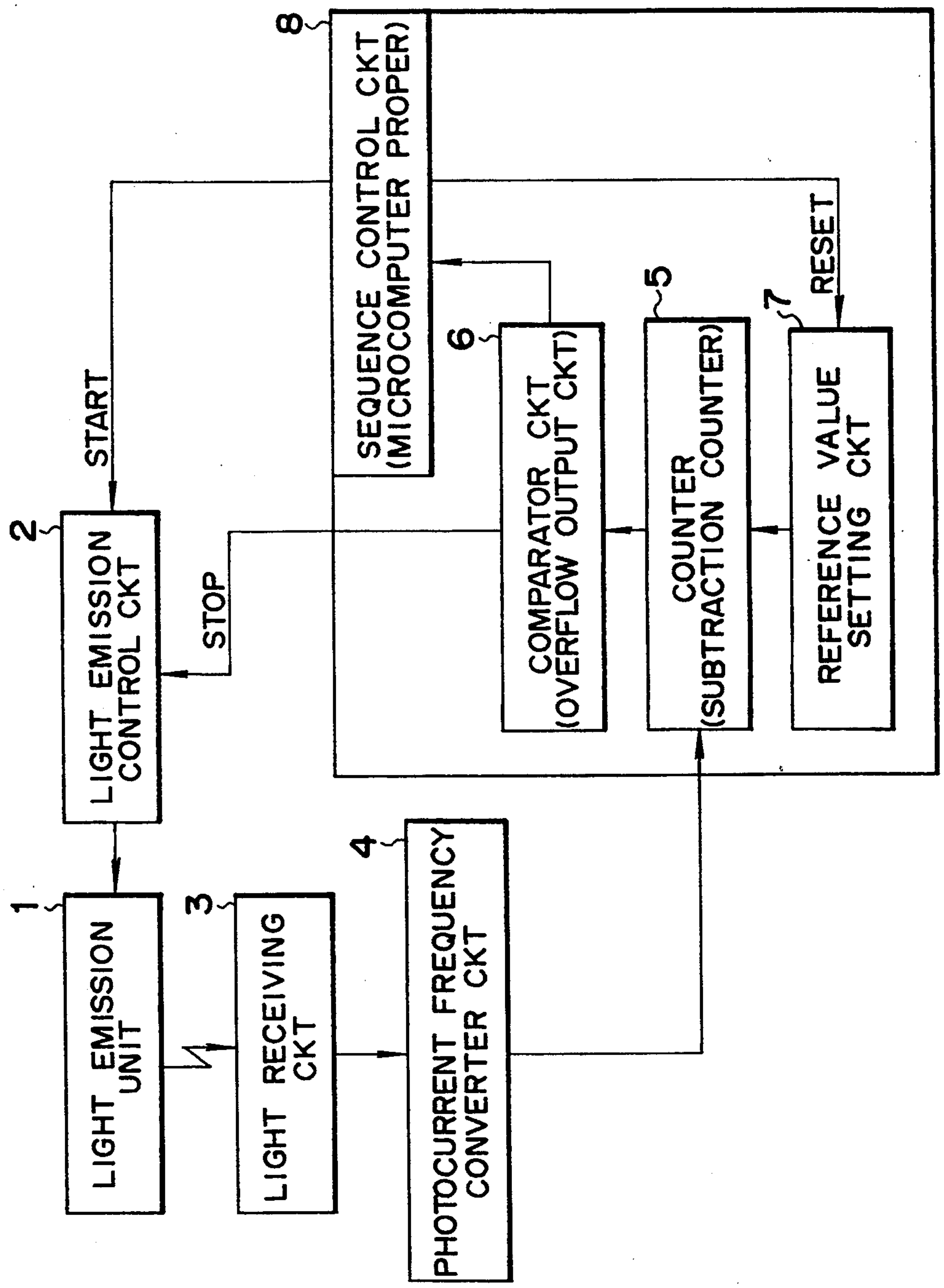
FIG. 9 is a block diagram of a fifth embodiment.

The following embodiment is also possible depending on the construction of the microcomputer. As shown in FIG. 9, the counter 5 is a subtraction counter, in which before light emission, data corresponding to a proper quantity of light is set by the reference value setting device 7. The subtraction in the counter 5 is progressed by the frequency output from the photocurrent-frequency converter circuit 4, and when the count by the counter 5 becomes 0 or when overflow is caused by the subtraction next to 0, a stop signal is output from the comparator circuit 6 to the light emission control circuit 2, whereby flashing is stopped. At the same time, whether overflow has been caused remains in a flag, and whether light emission has reached to a proper quantity of light can be confirmed. Like this, the comparator circuit 6 need not always be an interruption demand producing circuit, and the output thereof may be the two-division frequency output of the counter 5, i.e., an overflow output. This embodiment is rather approximate in construction to the hardware logic and therefore, more rapid light emission stoppage can be expected than in the fourth embodiment.

As described above, various examples of the construction using a microcomputer are conceivable, and a description will now be complementarily given of the value set in the reference value setting device 7. As is evident from what has hitherto been described, the value to be set as a reference value for a smaller quantity of light becomes smaller. For example, let it be assumed that as a combination for providing the smallest quantity of light in external auto flash control, an aperture F1.4 for film speed ISO100 has been set to a reference value 32. From this, the setting of an aperture F2 for film speed ISO100 which requires a double quantity of light is a reference value 64. The results of calculations likewise effected thereafter are shown in Table 1 below.

TABLE 1

Aperture Values and Reference Set Values at ISO 100

| Aperture Values | Reference Set Values |
|---|---|
| F1.4 | 32 |
| F2 | 64 |
| F2.8 | 128 |
| F4 | 256 |
| F5.6 | 512 |
| F8 | 1024 |
| F11 | 2048 |
| F16 | 4096 |
| F22 | 8192 |
| F32 | 16384 |

As is apparent from Table 1, a practically sufficient aperture range can be covered if there is a counter of the order of 16 bits. Accordingly, control is possible with a sufficient margin by a 16-bit counter usually contained in a microcomputer. Also, because there is a margin, for example, in Table 1, the reference value of F1.4 need not be 32, and there are still two steps of margin in terms of exposure amount until the reference value of F32 is rendered into a 16-bit full scale. Even when the resolving power is taken into consideration, F1.4 can be set up to the order of a reference value 8 and it can be said that there are also two steps of margin. Even in a construction wherein there is no adjustment of volume or the like as in the embodiments, manufacture may be made in the fashion of throwing-in and the reference values of individual products may be written into EEPROM on the basis of actual measurement.

In each embodiment, the output of the light receiving circuit is a photocurrent, but use can be made of any circuit which outputs a signal varying in conformity with the intensity of received light.

As described above, according to the present invention, most of the photometry circuit can be incorporated in a digital circuit such as a microcomputer to thereby realize a construction very suitable for numerical value calculation control. The analog system circuit in the photometry circuit can be very much simplified, and this is effective in respect of circuit space and cost. Also, as in the embodiments, an adjusting mechanism for volume or the like can be eliminated and automatic adjustment by the writing of data into individual products is also made possible, and this leads to a reduction in the cost of manufacture and further to the stability of quality against changes with time.

Also, the present invention is real-time photometry A/D conversion and the value of the counter is read out during flashing, whereby to what degree light has been emitted can be known, and the application of the present invention to a special light emission pattern can also be expected. Further, in light emission which does not reach a proper quantity of light, it is also possible to know how much under the exposure has been, from the ratio of the count value to the reference value.

The present invention is directed to the photometry of an electronic flash device, but in principle is sufficiently applicable to the photometry of steady light as well, and in that case, the intensity of the steady light can be known from the count value within a predetermined time, i.e., the frequency output. Accordingly, the present invention is also applicable to the AE control of a camera body.

What is claimed is:

1. A camera system comprising:

a first light receiving unit which produces a first current according to received light;

a second light receiving unit which produces a second current according to received light;

an electric charge storage unit which charges in accordance with said first current and discharges in accordance with said second current; and a control unit which causes said first and second light receiving units to charge and discharge said electric charge storage unit alternately in response to alternate discharging and charging of said electric charge storage unit to a first charge storage level and a second charge storage level, respectively, and for producing an output signal which varies in accordance with the charging and discharging of said electric charge storage unit.

2. A camera system according to claim 1, wherein the signal produced by said control unit is a binary signal the frequency of which depends upon the amount of light received by said light receiving units.

3. A camera system according to claim 1, wherein said control unit is responsive to a comparison of a first reference voltage and a voltage dependent upon the charging of said electric charge storage unit and is responsive to comparison of a second reference voltage, less than said first reference voltage, and a voltage dependent upon the discharging of said electric charge storage unit, such that the alternate charging and discharging of said electric charge storage unit is dependent upon the difference between said reference voltages.

4. A camera system comprising:
- a light receiving unit which produces current according to received light;
- a first electric charge storage unit;
- a second electric charge storage unit; and
- a control unit which causes said electric charge storage units to be charged alternately in accordance with said current produced by said light receiving unit and to be discharged alternately, said control unit being responsive to the charging of said first electric charge storage unit to a first charge storage level and to the charging of said second electric charge storage unit to a second charge storage level for effecting the alternate charging and discharging of said electric charge storage units and for producing an output signal which varies with the charging and discharging of said electric charge storage units.

5. A camera system according to claim 4, wherein said signal produced by said control unit is a binary signal the frequency of which depends upon the amount of light received by said light receiving unit.

6. A camera system according to claim 4, wherein said control unit is responsive to comparison between a first reference voltage and a voltage dependent upon the charging of said first electric charge storage unit and to a comparison between a second reference voltage and a voltage dependent upon the charging of said second electric charge storage unit for effecting the alternate charging and discharging of said electric charge storage units.

7. A camera system comprising:
- a light receiving unit which produces current according to received light;
- an electric charge storage unit which is charged according to said current; and
- a control unit dependent upon a predetermined level of charge of said electric charge storage unit for discharging said electric charge storage unit by a predetermined current for a predetermined time and for producing an output signal which varies with the charging and discharging of said electric charge storage unit.

8. A camera system according to claim 7, wherein said output signal produced by said control unit is a binary signal the frequency of which depends upon the frequency of the charging and discharging of said electric charge storage unit.

9. A camera system according to claim 7, wherein said control unit includes a constant current generator which generates said predetermined current.

10. A camera system according to claim 7, wherein said control unit includes an oscillator, the frequency of which determines said predetermined time.

* * * * *